United States Patent
Idoguchi

(10) Patent No.: US 6,708,719 B2
(45) Date of Patent: Mar. 23, 2004

(54) MOUNTING STRUCTURE FOR HIGH PRESSURE GAS VESSELS AND MOUNTING METHOD

(75) Inventor: Ryuichi Idoguchi, Kanagawa-ken (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/297,610

(22) PCT Filed: Apr. 12, 2002

(86) PCT No.: PCT/JP02/03693
§ 371 (c)(1),
(2), (4) Date: Dec. 13, 2002

(87) PCT Pub. No.: WO02/093068
PCT Pub. Date: Nov. 21, 2002

(65) Prior Publication Data
US 2003/0146214 A1 Aug. 7, 2003

(30) Foreign Application Priority Data
May 16, 2001 (JP) .................................... 2001-146377

(51) Int. Cl.$^7$ ................................................ B65D 8/00
(52) U.S. Cl. .............. 137/266; 137/606; 137/607; 222/135; 220/23.4
(58) Field of Search ................. 220/23.4; 222/135, 222/266; 137/607, 606; 239/414

(56) References Cited

U.S. PATENT DOCUMENTS

| 4,496,081 A | 1/1985 | Farrey | |
|---|---|---|---|
| 4,773,562 A | * 9/1988 | Gueret | 222/135 |
| 4,792,062 A | * 12/1988 | Goncalves | 222/135 |
| 4,958,750 A | * 9/1990 | Palmert et al. | 222/135 |
| 5,356,040 A | * 10/1994 | Reggiani | 222/129 |
| 5,385,263 A | 1/1995 | Kirk et al. | |
| 5,634,571 A | * 6/1997 | Cataneo et al. | 222/80 |
| 5,813,429 A | * 9/1998 | Ohtaka et al. | 137/266 |
| 5,924,599 A | * 7/1999 | Brown | 222/135 |
| 6,308,863 B1 | * 10/2001 | Harman | 222/135 |

FOREIGN PATENT DOCUMENTS

| DE | 38 05 497 C1 | 4/1989 |
|---|---|---|
| FR | 2 642 142 A1 | 7/1990 |
| JP | 8-99542 A | 4/1996 |
| WO | WO 00/24608 A1 | 5/2000 |

\* cited by examiner

*Primary Examiner*—Joseph Man-Fu Moy
(74) *Attorney, Agent, or Firm*—Foley & Lardner

(57) ABSTRACT

A mounting structure, for a plurality of high pressure gas vessels (11*a*, 11*b*), has a block-shaped vessel mounting member (1) with a high rigidity formed with accommodating portions (5*a*, 5*b*, 9*a*, 9*b*) for accommodating first neck portions (12*a*, 12*b*) formed at one sides of the plural high pressure gas vessels and vessel base-valves (13*a*, 13*b*) and formed with a gas flow passage (6) that opens at openings (7*a*, 7*b*) of right and left side walls of the vessel mounting member (1) to allow the accommodating portions to communicate with one another. The neck portions (12*a*, 12*b*) and the vessel base-valves (13*a*, 13*b*) at the one sides of the plural high pressure gas vessels are accommodated in the accommodating portions (5*a*, 5*b*, 9*a*, 9*b*) of the vessel mounting member 1, and the plural high pressure gas vessels are mounted in the vessel mounting member (1), enabling the gas flow passage 6, formed in the vessel mounting member (1), to serve as a high pressure conduit portion.

15 Claims, 12 Drawing Sheets

MOUNTING STRUCTURE FOR HIGH PRESSURE GAS VESSELS AND MOUNTING METHOD

TECHNICAL FIELD

The present invention relates to a mounting structure for high pressure gas vessels and a mounting method and, more particularly, a mounting structure for high pressure gas vessels filled with high pressure fuel gas to be used as fuel in a fuel cell powered vehicle or the like and its related mounting method.

BACKGROUND ART

In recent years, a fuel cell powered vehicle which incorporates a fuel cell stack, as a power drive source, that generates electric power output upon electrochemical reaction between hydrogen and oxygen has heretofore been extensively focused as a vehicle to realize a reduced environmental pollution, and considerable research and development work has been currently undertaken toward the realization of such object.

There are some instances where pure hydrogen is selected as fuel of the fuel cell powered vehicle because of an extremely high total energy efficiency and less load to be affected in the environment.

Various structures have been studied to develop a particular structure for mounting a pure hydrogen vessel in the fuel cell powered vehicle, such as a structure composed of hydrogen occlusion alloy or a liquefied hydrogen tank. At current stages, one of the most realistic technologies to achieve such object is to provide a structure to allow high pressure hydrogen gas to be filled in a high pressure gas vessel to be installed in the fuel cell powered vehicle.

When filling high pressure hydrogen gas into the high pressure gas vessel to be mounted in the fuel cell powered vehicle and suitably mounting the high pressure gas vessel to a vehicle body while suitably plumbing connections of a high pressure conduit to be coupled to the high pressure gas vessel, it is an important theme for research and development work to be undertaken for allowing a hermetic sealing property to be enhanced in connecting portions between the high pressure gas vessel and the high pressure conduits and in joint portions among the high pressure conduits in a highly reliable manner.

Japanese Patent Application Laid-Open Publication No. H8-99542 discloses a plumbing technology, for pipe members within a vehicle, to permit a sub-frame structure composed of a fuel system and a high pressure piping system to be assembled in another sub-line prior to assembling the pipe members to the vehicle.

DISCLOSURE OF INVENTION

However, with such a structure, the plumbing operation tends to be adversely and strongly affected with various factors such as a vehicle body structure or a particular structure of the fuel system. As shown in FIG. 16, as the number of high pressure gas vessels 100, that specifically serve as fuel vessels to be mounted in the vehicle, increases, the pipe members P become complicated in structure and, also, an issue is encountered in plumbing shapes of the pipe members owing to a tolerance in design of and a variation in mounting positions of a fixing device and the fuel vessel that form the fuel system. As a result, special skills are required for extending the pipe members and for assembling these component parts. Further, the presence of increase in joint portions to be connected between the pipe members with respect to one another results in an increase in the number of joint portions which require particular hermetic sealing measures, causing an increased cost as well as an increased weight.

More particularly, when taking into consideration about a case where the high pressure gas vessel filled with high pressure hydrogen gas is mounted in the fuel cell powered vehicle, it is highly required for the high pressure pipe portions between the high pressure gas vessel and a pressure reducing valve to enhance a hermetic sealing effect.

In such a case, as shown in FIG. 17, it is possible for the study to be undertaken for providing a structure wherein the pressure reducing valve 101 is incorporated in the high pressure vessel 100 to deliver hydrogen gas, that is reduced in pressure, from an outlet of the high pressure gas vessel 100 to the fuel cell system. With such a structure, since the pipe member PO connected to the outlet side of the high pressure gas vessel 100 serves as a low pressure pipe, there is a reduction in the number of areas to which the hermetic sealing measures are to be undertake. Also, in the drawing, reference numeral 200 designates a charge port for high pressure gas and reference symbol PI designates a conduit connected between the charge port 200 and the high pressure gas vessel 100.

By the way, in the fuel cell powered vehicle, it is desired for high pressure hydrogen gas to be mounted in the vehicle by an amount as many as possible in order to enhance a tank mileage that can resists a practical use. Although it is thought that a technology to mount a large amount of high pressure gas in the vehicle is to use a largely sized high pressure gas vessel, it is fairly difficult to mount the large size high pressure gas vessel due to limitations in a layout of the vehicle. Thus, it is realistic to mount a plurality of relatively small size high pressure gas vessels.

In such a case, as shown in FIG. 18, if pressure reducing valves 101a, 101b are contained in the plurality of high pressure gas vessels 100a, 100b, respectively, either one of the pipe members POa, POb becomes the low pressure pipe, making it possible to take advantage of a reduction in the number of areas to which hermetic sealing measures are to be undertaken. With such a structure, however, it is considered that there is a variation in the amount of gas consumed in the high pressure gas vessels 100a, 100b owing to the variation in preset values in the pressure reducing valves 101a, 101b contained in the respective high pressure gas vessels 100a, 100b, and the use of the plural number of pressure reducing valves 101 causes a rise in cost and an increase in the weight.

To address this issue, as shown in FIG. 19, it is considered to be effective to employ a structure wherein the high pressure gas vessel 101a, containing therein the pressure reducing valve 101, and the high pressure gas vessel 101b containing no pressure reducing valve 101 are combined in use in a case where the fuel cell powered vehicle is mounted with the plurality of high pressure gas vessels.

With such a structure, however, the pipe member POb', that interconnects the high pressure gas vessel 101a, containing therein the pressure reducing valve 101, and the high pressure gas vessel 101b with no pressure reducing valve 101 to one another serves as the high pressure pipe, with portions of the same being required to have a hermetic sealing effect.

The present invention has been made upon foregoing studies and has an object to provide a mounting structure and a mounting method for high pressure gas vessels wherein areas corresponding to high pressure pipes are reliably protected while precluding a stress strain from being generated at joined portions by precisely mounting the high pressure vessels for thereby enhancing a highly improved hermetic sealing effect.

To achieve the above object, according to one aspect of the present invention, there is provided a mounting structure for a plurality of high pressure gas vessels each of which has one end formed with a first neck portion, comprising: a block-shaped vessel mounting member allowing each of the plurality of high pressure gas vessels to be mounted; a plurality of accommodating portions located in the vessel mounting member, with each of the plurality of accommodating portions having a shape that corresponds to the first neck portion of corresponding one of the plurality of high pressure gas vessels and a base-valve mounted at the first neck portion so as to accommodate the first neck portion and the base-valve; and a gas flow passage located in the vessel mounting member to allow gas, contained in each of the plurality of high pressure gas vessels, to pass therethrough, the gas flow passage allowing the plurality of accommodating portions to communicate with one another while allowing the vessel mounting member to open at one side thereof and at the other side thereof. Each of the plurality of high pressure gas vessels is mounted to the vessel mounting member under a condition where the first neck portion and the base-valve, mounted at the first neck portion, are received in corresponding one of the plurality of accommodating portions located in the vessel mounting member.

In other words, a mounting structure, according to the present invention, for a plurality of high pressure gas vessels each of which has one end formed with a first neck portion, comprises: vessel mounting means for allowing each of the plurality of high pressure gas vessels to be mounted; accommodating means, which is located in the vessel mounting means, for accommodating the first neck portion and a base-valve mounted to the first neck portion, the accommodating means being associated with the plurality of high pressure gas vessels and having a shape that corresponds to the first neck portion and the base-valve mounted at the first neck portion of corresponding one of the plurality of high pressure gas vessels; and gas flow passage means, which is located in the vessel mounting means, for allowing gas, contained in each of the plurality of high pressure gas vessels, to pass therethrough, the gas flow passage means allowing the accommodating means to communicate with an outside of the vessel mounting means. Each of the plurality of high pressure gas vessels is mounted to the vessel mounting means under a condition where the first neck portion and the base-valve, mounted to the first neck portion, are received in the accommodating means located in the vessel mounting means.

On the other hand, according to the present invention, a method for mounting a plurality of high pressure gas vessels each of which has one end formed with a first neck portion, comprises: preparing a vessel mounting member which is formed with a plurality of accommodating portions and a gas flow passage, the plurality of accommodating portions being associated with the plurality of high pressure gas vessels, respectively, and each of the plurality of accommodating portions having a shape that corresponds to the first neck portion and the base-valve mounted at the first neck portion of corresponding one of the plurality of high pressure gas vessels, the gas flow passage allowing gas, contained in each of the plurality of high pressure gas vessels, to flow therethrough and allowing the plurality of accommodating portions to communicate with one another while opening at both one side and the other side of the vessel mounting member; accommodating the first neck portion of each of the plurality of high pressure gas vessels and the base-valve mounted at the neck portion in corresponding one of the plurality of accommodating portions formed in the vessel mounting member; and mounting each of the plurality of high pressure gas vessels in the vessel mounting member under a condition where the first neck portion and the base-valve, mounted to the first neck portion, are received in corresponding one of the plurality of accommodating portions located in the vessel mounting member.

Other and further features, advantages, and benefits of the present invention will become more apparent from the following description taken in conjunction with the following drawings.

BEST MODE FOR CARRYING OUT THE INVENTION

To describe the present invention more in detail, preferred embodiments of the present invention will be explained with reference to the drawings below. Also, the preferred embodiments will be described in conjunction with mounting structures for high pressure gas vessels which are shown as examples to be mounted in a fuel cell powered vehicle.

First Preferred Embodiment

Initially, a first preferred embodiment of the present invention is described in detail. With the mounting structure for the high pressure gas vessels of the first preferred embodiment, a plurality of high pressure vessels are intended to be mounted in the fuel cell powered vehicle under a condition where respective one ends are fixed to a vessel mounting member.

Figure 1:
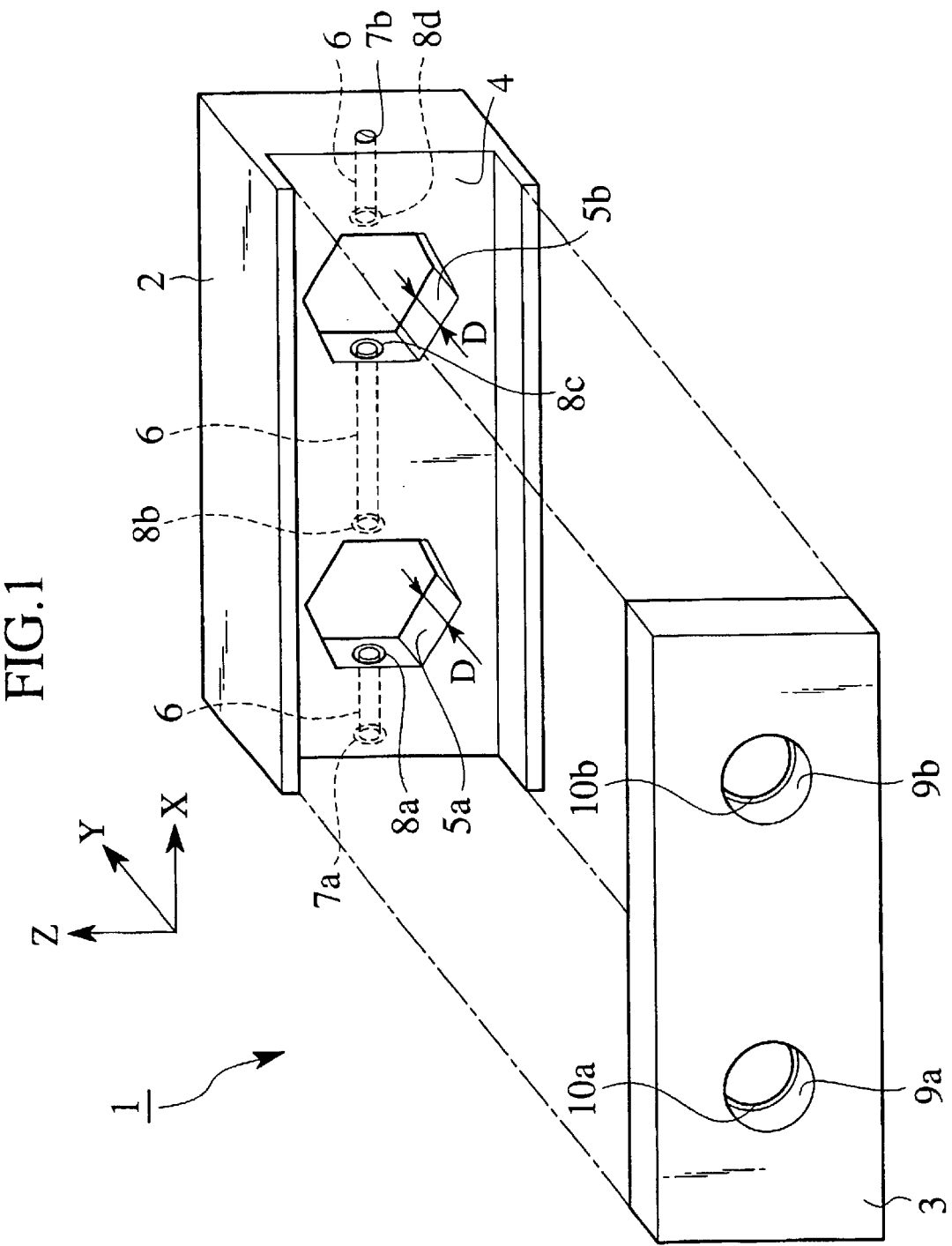
FIG. 1 is an exploded perspective view of a vessel mounting member to be employed in a mounting structure for high pressure gas vessels of a first preferred embodiment according to the present invention.

FIG. 1 shows the vessel mounting member to be applied to the mounting structure for the high pressure vessel of the first preferred embodiment.

In FIG. 1, the vessel mounting member 1 is formed into a block shape of a rectangular body which is made of a material having an adequate strength such as metal or plastic resin to provide a sufficient rigidity and is comprised of a combination of a body section 2, and a flange section 3 composed of a rectangular body that is detachably coupled to the body section 2.

The body section 2 has a main surface formed with a recessed portion 4, to accommodate an outer periphery of the flange section 3, to which an upper end of the flange section 3 is fitted to form a unitary structure of the vessel mounting member 1. Further, a bottom wall of the recessed portion 4 is formed with first and second base-valve accommodating concave portions 5a, 5b which have respective depths D along a thickness direction (Y-direction) of the body section 2 and respective shapes to accommodate outer profiles of respective base valves to be mounted to neck portions of the respective distal ends of the high pressure vessels as will be described later. Shapes of the first and second base-valve accommodating concave portions 5a, 5b are designed to be identical with respect to one another, for the sake of structural convenience, because the associated high pressure vessels have the same shapes and shapes of the respective base-valves are shown to be identical to one another.

Further, the body section 2 is formed with a gas flow passage 6 that extends in a longitudinal direction (X-direction). The gas flow passage 6 allows the first and second base-valve accommodating concave portions 5a, 5b to communicate with one another, with the gas flow passage 6 having a first opening 7a exposed at one side of the body section 2 and a second opening 7b exposed at the other side of the body section 2. And, O-rings 8a, 8b are disposed at boundaries between the gas flow passage 6 and the first base-valve accommodating concave portion 5a, and O-rings 8c, 8d are disposed at boundaries between the gas flow passage 6 and the second base-valve accommodating concave portions 5b.

On one hand, the flange section 3 is formed with first and second through-bores 9a, 9b that have shapes to accommodate the neck portions of the one ends of the high pressure gas vessels. The first and second though-bores 9a, 9b have identical shapes to accommodate the identical shapes of the respective high-pressure vessels whereby when the flange section 3 is tightly fitted to the recessed portion 4 of the body section 2 to compel the flange section 3 and the body section 2 to be assembled with respect to one another, the first and second through-bores 9a, 9b communicate with the first and second base-valve accommodating concave portions 5a, 5b of the body section 2, respectively, to form a unitary accommodating structure. Also, opening edges of the first and second through-bores 9a, 9b facing the body section 2 are seated with O-rings 10a, 10b, respectively.

Figure 2:
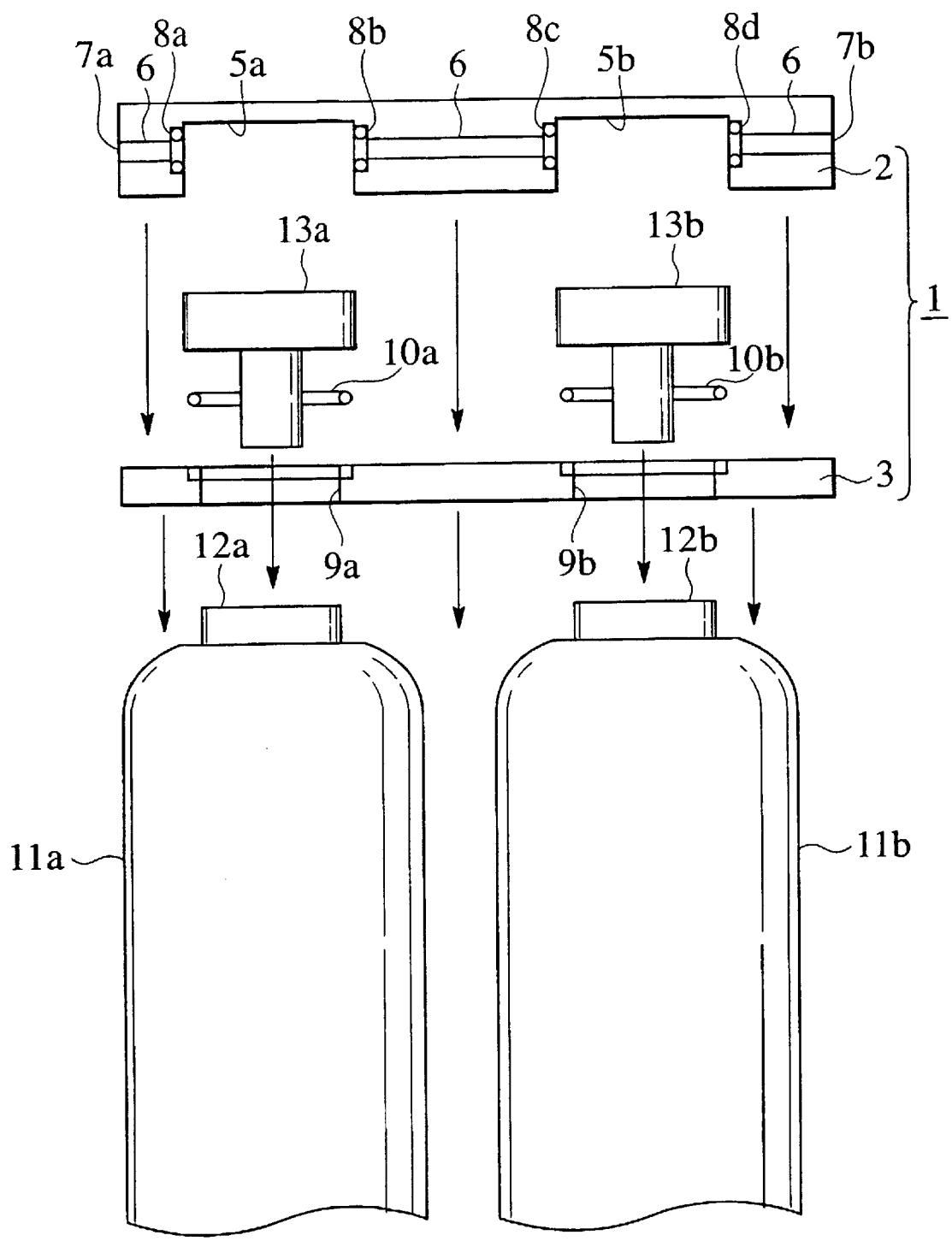
FIG. 2 is a typical view illustrating how one sides of first and second high pressure gas vessels are mounted to the vessel mounting member of the first preferred embodiment.

Now, FIG. 2 shows how the high pressure gas vessels are mounted to the vessel mounting member 1 which are constructed in such a manner as described above.

Initially, when mounting two high pressure gas vessels (the first and second high pressure gas vessels 11a, 11b) to the vessel mounting member 1, the neck portions 12a, 12b of the one ends of the first and second high pressure gas vessels 11a, 11b are inserted through the first and second through-bores 9a, 9b formed in the flange section 3 of the vessel mounting member 1, respectively.

Subsequently, under a condition where the neck portions 12a, 12b are accommodated in the first and second through-bores 9a, 9b, respectively, the vessel base-valves 13a, 13b are coupled to the neck portions 12a, 12b, respectively.

As such, the flange section 3 of the vessel mounting member 1 is sandwiched between the first and second high pressure vessels 11a, 11b and the vessel base-valves 13a, 13b to be unitized with respect to these component parts.

In next step, the flange section 3 of the vessel mounting member 1 is fitted to the recessed portion 4 of the base section 2 to cause the flange section 3 and the base section 2 to be assembled with respect to one another. When this takes place, the vessel base-valves 13a, 13b, that protrude from the flange section 3, are received in the first and second base-valve accommodating concave portions 5a, 5b formed in the body section 2, respectively.

Figure 3:
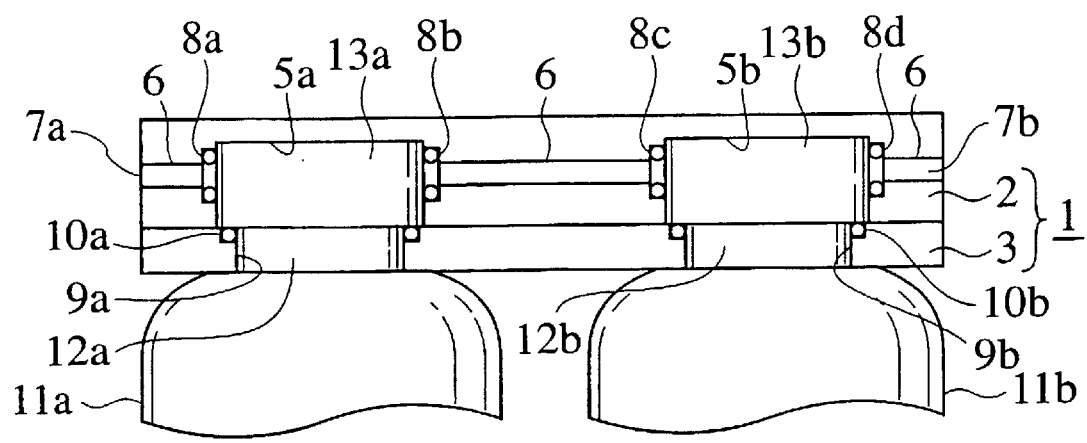
FIG. 3 is a typical view illustrating a state where one sides of first and second high pressure gas vessels have been mounted to the vessel mounting member of the first preferred embodiment.
Figure 4:
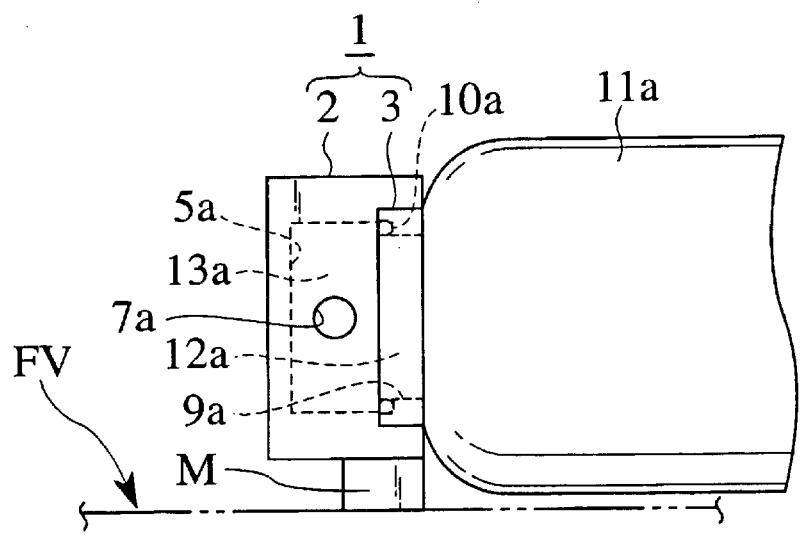
FIG. 4 is a side view illustrating the state where one sides of first and second high pressure gas vessels have been mounted to the vessel mounting member of the first preferred embodiment.

Thus, the one ends of the first and second high pressure gas vessels 11a, 11b are mounted to the vessel mounting member 1 as shown in FIGS. 3 and 4 such that these component parts are supported with the vessel mounting member 1.

Subsequently, the first and second high pressure gas vessels 11a, 11b whose one ends are mounted to the vessel mounting member 1 and retained thereby are then mounted at a desired position within the fuel cell powered vehicle FV with the use of a suitable mounting member M while maintaining the above condition.

And, the first opening 7a exposed at the one side of the body section 2 of the vessel mounting member 1 is connected to a high pressure gas charge line of the fuel cell powered vehicle, while the second opening 7b exposed at the other side of the body section 2 of the vessel mounting member 1 is connected to a fuel intake line of a fuel cell system.

Now, the flow of fuel gas running in the fuel cell powered vehicle into which the first and second high pressure gas vessels 11a, 11b are mounted is described below in detail with reference to FIG. 5.

Figure 5:
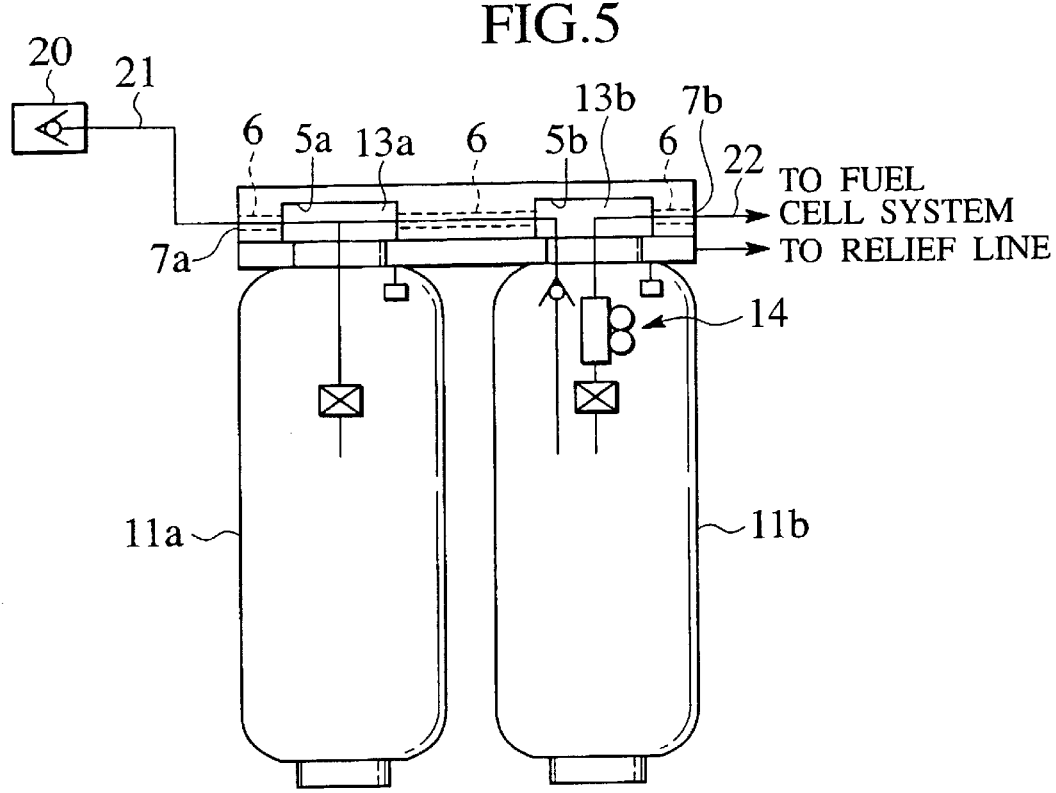
FIG. 5 is a view illustrating the flow of fuel gas in a case where the first and second high pressure gas vessels, mounted to the vessel mounting member, have been installed in a fuel cell powered vehicle of the first preferred embodiment.

As depicted in FIG. 5, among the first and second high pressure gas vessels 11a, 11b, the inside of the second high pressure gas vessel 11b located at a trailing area of the gas flow passage 6 formed in the body section 2 of the vessel mounting member 1 contains therein a pressure reducing valve 14 to allow a low pressure fuel gas to be discharged from the second high pressure gas vessel 11b.

More particularly, at a fuel infrastructure, high pressure fuel gas charged into the fuel cell powered vehicle from a fuel charge nozzle 20 is supplied through a fuel gas charge line 21 inside the fuel cell powered vehicle and the first opening 7a exposed to the one side of the body section 2 of the vessel mounting member 1 to the gas flow passage 6.

Subsequently, high pressure fuel gas supplied to the gas flow passage 6 is delivered through the vessel base-valve 13a into the first high pressure gas vessel 11a and is stored therein, with high pressure fuel gas being further delivered through the vessel base-valve 13b to the second high pressure gas vessel 11b to be stored therein.

Next, under a condition wherein high pressure fuel gas is stored in the first and second high pressure gas vessels 11a, 11b, if a the fuel cell system is started up to begin the operation, high pressure fuel gas stored in the second high pressure gas vessel 11b is reduced in pressure with the pressure reducing valve 14 to form low pressure fuel gas which is supplied through the vessel base-valve 13b to the trailing side of the gas flow passage 6. Further, high pressure fuel gas stored in the first pressure gas vessel 11a is supplied through the vessel base-valve 13a to a midway of the gas flow passage 6 between the first and second vessel accommodating concave portions 5a, 5b to allow high pressure fuel gas to flow into the second high pressure gas vessel 11b at once and subsequently to allow high pressure fuel gas to be reduced in pressure by the pressure reducing valve 14 contained in the second high pressure gas vessel 11b to create low pressure fuel gas that is then supplied through the vessel base-valve 13b to the trailing side of the gas flow passage 6.

Subsequently, low pressure fuel gas supplied to the trailing area of the gas flow passage 6 is then supplied through the opening 7b exposed at the other side of the body section 2 to the fuel intake line 22 of the fuel cell system.

And, low pressure fuel gas supplied to the fuel intake line 22 is utilized in the fuel cell stack for generating electric power output.

Figure 6:
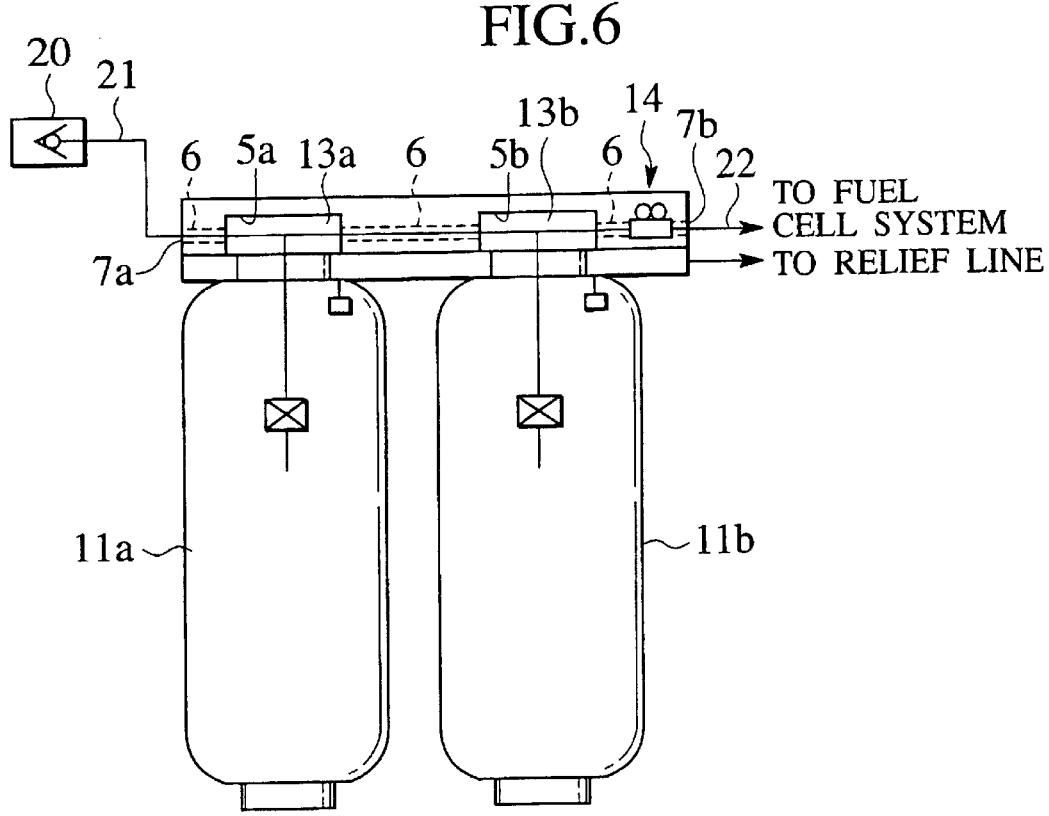
FIG. 6 is a view illustrating the flow of fuel gas in a case where the first and second high pressure gas vessels, mounted to the vessel mounting member, have been installed in a fuel cell powered vehicle and also illustrating an example of a case where a pressure reducing valve is contained inside the vessel mounting member of the first preferred embodiment.

Further, in stead of locating the pressure reducing valve 14 in the second high pressure gas vessel 11b, as depicted in FIG. 6, the pressure reducing valve 14 may be located in the trailing area of the gas flow passage 6 of the body section 2 of the vessel mounting member 1 in an alternative structure wherein low pressure fuel gas is also discharged from the vessel mounting member 1.

As will be appreciated from the foregoing description, with the mounting structure for the high pressure gas vessels of the preferred embodiment, since the gas flow passage 6 formed in the body section 2 of the vessel mounting member 1 functions as a high pressure conduit section to allow the flow of high pressure fuel gas and the gas flow passage 6, serving as the high pressure conduit, is structurally arranged to be formed in the vessel mounting member 1 of a block shape having an adequate rigidity, such a high pressure conduit section (gas flow passage 6) per se tends to have an increased strength to enable a hermetic sealing effect to be effectively enhanced in such a high pressure conduit section (gas flow passage 6).

Further, with the mounting structure for the high pressure gas vessel of the preferred embodiment, the presence of the gas flow passage 6 formed in the body section 2, along its longitudinal direction, of the vessel mounting member 1 compels it to serve as the flow passage for high pressure fuel gas to be supplied to the first high pressure gas vessel 11a via the fuel gas charge line 21 and to serve as the flow passage for high pressure fuel gas to be supplied to the second high pressure gas vessel 11b from the first high pressure gas vessel 11a such that the flow passage for high pressure fuel gas is unified, providing a capability of a further effectively increased hermetic sealing effect.

Furthermore, with the mounting structure for the high pressure gas vessels of the preferred embodiment, the use of so-called remaining pressure in the gas flow passage 6 between the fuel gas charge line 21 and the first high pressure gas vessel 11a enables a surface sealing effect to be improved in the gas flow passage 6 between the first high pressure gas vessel 11a and the second high pressure gas vessel 11b, with a resultant hermetic sealing effect being effectively provided at boundary areas between the gas flow passage 6 and the first and second high pressure gas vessels 11a, 11b.

Moreover, with the mounting structure for the high pressure gas vessel of the preferred embodiment, while pressure is exerted to a first flow passage segment of the gas flow passage 6, connected between the fuel gas charge line 21 and the first pressure gas vessel 11a, and to a second flow passage segment of the gas flow passage 6 between the first high pressure gas vessel 11a and the second high pressure gas vessel 11b as high pressure fuel gas is supplied thereto, these gas flow passage segments forms series-connected flow passages formed in the body section 2 of the vessel mounting member 1 to equalize the pressure levels therein, with a resultant improved sealing effect in the gas flow passage 6 while further effectively enhancing a hermetic sealing effect at the boundaries between the first and second high pressure gas vessels 11a, 11b.

In addition, with the mounting structure for the high pressure gas vessels of the preferred embodiment, since the neck portions 12a, 12b of one ends of the first and second high pressure gas vessels 11a, 11b are accommodated in the through-bores 9a, 9b formed in the flange section 3 of the vessel mounting member 1 with the vessel base-valves 13a, 13b mounted to the neck portions 12a, 12b being received in the base-valve accommodating concave portions 5a, 5b formed in the body section 2 of the vessel mounting member 1 for thereby unitarily determining the mounting positions of the one ends of the first and second high pressure gas vessels 11a, 11b with respect to the vessel mounting member 1, the first and second high pressure gas vessels 11a, 11b are enabled to be mounted at an extremely high precision to preclude the deficiency of stress-strains that would be otherwise caused at the joined portions of these component parts relative to the gas flow passage 6 due to positional displacements thereof for thereby effectively enhancing a hermetic sealing effect at such joined portions.

Furthermore, with the mounting structure for the high pressure gas vessels of the preferred embodiment, the presence of the structure wherein the body section 2 and the flange section 3 are assembled to form the vessel mounting member 1 enables the mounting operations of the first and second high pressure gas vessels 11a, 11b relative to the vessel mounting member 1 to be carried out in an extremely simple manner. That is, inserting the neck portions 9a, 9b, formed at the one ends of the first and second high pressure gas vessels 11a, 11b, through the through-bores 9a, 9b formed in the flange section 3, respectively, and mounting the vessel base-valves 13a, 13b at these neck portions 12a, 12b whereupon these vessel base-valves 13a, 13b are received in the base-valve accommodating concave portions 5a, 5b formed in the body section 2 allows the first and second high pressure gas vessels 11a, 11b to be mounted to the vessel mounting member 1 in an extremely simplified mounting work.

Besides, with the mounting structure for the high pressure gas vessel of the preferred embodiment, the presence of the pressure reducing valve 14 located inside the second high pressure gas vessel 11b positioned at the trailing side of the gas flow passage 6 to allow low pressure fuel gas to be discharged from the second high pressure gas vessel 11b provides an ease of manipulating the piping at a rear stage of the vessel mounting member 1 for thereby enabling the assembling workability to be highly improved. Such an effect is also similarly obtained even in a case where, in place of locating the pressure reducing valve 14 in the second high pressure gas vessel 11b, the pressure reducing valve 14 is located in the trailing side of the gas flow passage 6 of the body section 2 of the vessel mounting member 1, as depicted in FIG. 6, to enable low pressure fuel gas to be discharged from the vessel mounting member 1.

In addition, while the preferred embodiments have been described above in detail with reference to particular structures, the invention is not limiting the scope of the invention and it will be appreciated by those skilled in the art that various modification and alternatives to those details could be developed depending on various situations, such as for example in cases wherein the shape of the vessel mounting member 1 is configured to have a profile to correspond to an installation space.

Further, while a foregoing description has been made to easily illustrate featuring characteristics of the structure of the invention with a specific reference to a structural example wherein two high pressure gas vessels are mounted, it is to be noted that such a structure may also be effectively applied to a case wherein more than three high pressure gas vessels are mounted in fixed places.

Furthermore, while, to simplify the structure of the invention, the foregoing description has been made with reference to a situation wherein the respective high pressure gas vessels have the shapes equal to one another with the associated components parts of the vessel mounting member 1 having the shapes equal to one another, it is to be understood that such shapes may also be differently configured if desired.

Second Preferred Embodiment

Figure 7:
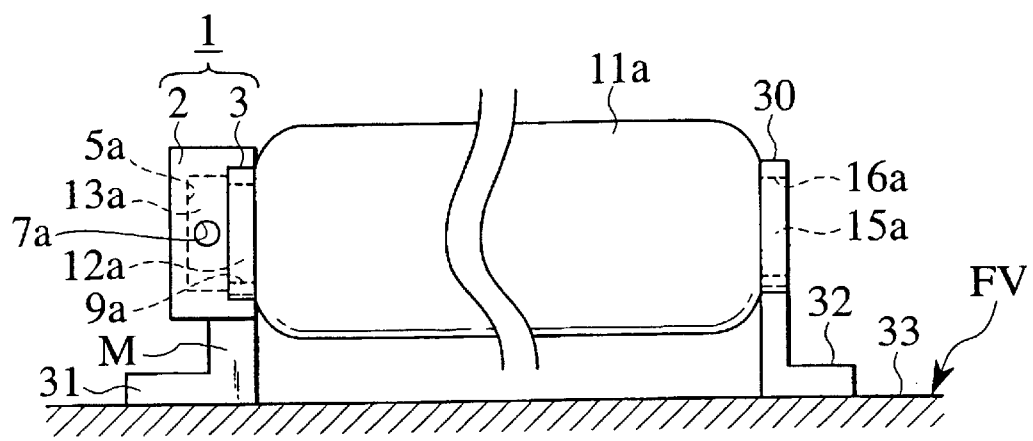
FIG. 7 is a side view illustrating a second preferred embodiment according to the present invention wherein the first and second high pressure gas vessels are installed in a fuel cell powered vehicle under a condition in that the first and second high pressure gas vessels have one ends mounted to a vessel mounting member and the other ends mounted to an auxiliary member.
Figure 8:
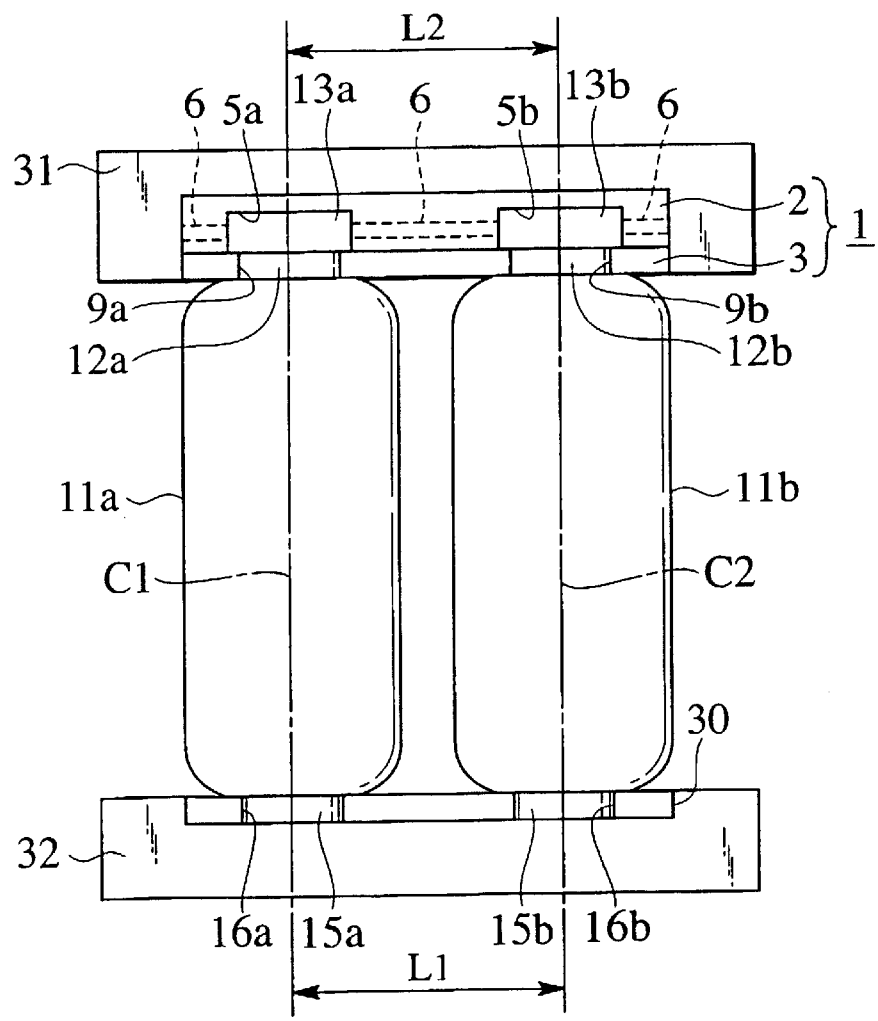
FIG. 8 is a plan view typically illustrating how the first and second high pressure gas vessels are installed on a mount surface of the fuel cell powered vehicle of the second preferred embodiment.
Figure 9:
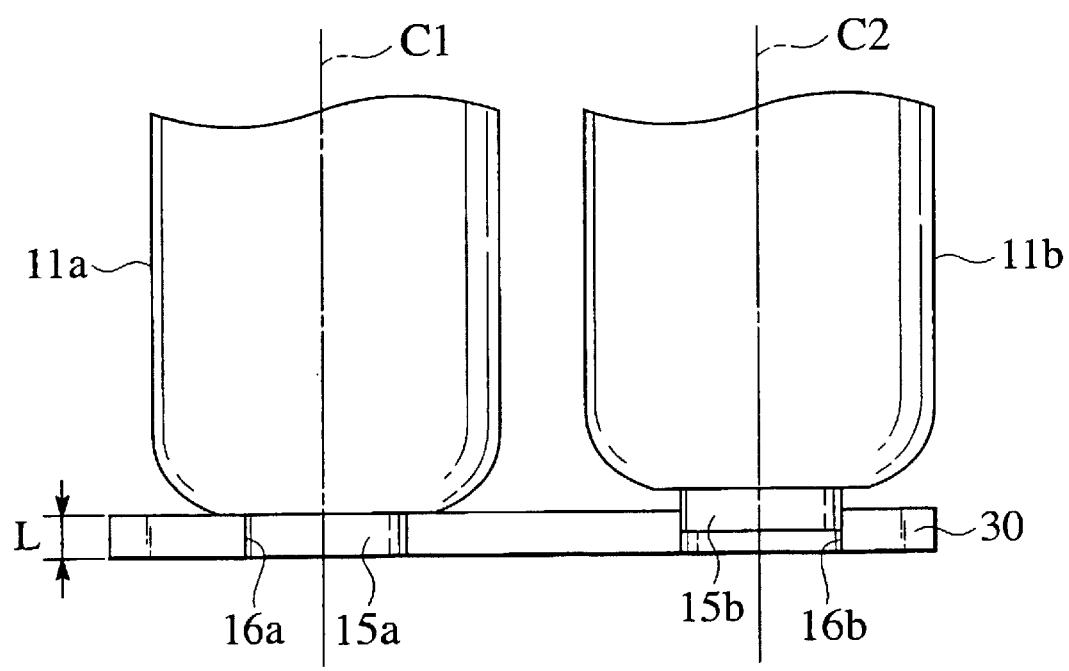
FIG. 9 is a typical view illustrating how a variation in vessel heights of the first and second high pressure gas vessels has been absorbed with the auxiliary member of the second preferred embodiment.

Now, a second preferred embodiment of the present invention is described below in detail. In a mounting structure for the high pressure gas vessel of the presently filed embodiment, as shown in FIGS. 7 and 8, the one ends of the first and second high pressure gas vessels 11a, 11b are mounted to and retained with the vessel mounting member 1 and, in addition thereto, the other ends of the first and second high pressure gas vessels 11a, 11b are mounted to and retained with an auxiliary member 30 which is installed in the fuel cell powered vehicle FV. Also, in the presently filed embodiment, the vessel mounting member 1 has a fundamental structure substantially similar to that of the first preferred embodiment and, therefore, a detailed description of the same is herein omitted.

In FIGS. 7 and 8, the auxiliary member 30 is formed to have a rectangular plate-like basic shape of the same block configuration as the flange section 3 of the vessel mounting member 1 and is used for the neck portions 15a, 15b of the other ends of the first and second high pressure gas vessels 11a, 11b. And, the auxiliary member 30 is formed with first and second through-bores 16a, 16b in shapes to correspond to the neck portions 15a, 15b of the other ends of the first and second high pressure gas vessels 11a, 11b. The center distance L1 between the first and second through-bores 16a, 16b are determined to be equal to the center distance L2 between the first and second through-bores 9a, 9b formed in the flange section 3 of the vessel mounting member 1.

With the mounting structure for the high pressure gas vessels of the presently filed embodiment, one sides (at the sides of the neck portions 12a, 12b) of the first and second high pressure gas vessels 11a, 11b are mounted to and retained with the vessel mounting member 1 as in the first preferred embodiment and are fixed to a mount surface 33 of the fuel cell powered vehicle FV via a mounting member M. Also, reference numeral 31 designates a flange shaped leg portion of the mounting member M.

On the other hand, other sides (at the side of the neck portions 15a, 15b) of the first and second high pressure gas vessels 11a, 11b are inserted through the first and second through-bores 16a, 16b formed in the auxiliary member 30, respectively, to be accommodated therein. In this instance, the center distance L1 between the first and second through-bores 16a, 16b formed in the auxiliary member 30 is settled to be substantially equal to the center distance L2 between the first and second through-bores 9a, 9b formed in the flange section 3 of the vessel mounting member 1. And, the other sides of the first and second high pressure gas vessels 11a, 11b are fixed to the mount surface 33 of the fuel cell powered vehicle FV via the auxiliary member 30. Also, reference numeral 32 designate a flange shaped leg portion of the auxiliary member 30. The presence of the structure wherein the center distance L1 between the first and second through-bores 16a, 16b formed in such an auxiliary member 30 is equal to the center distance 12 between the first and second through-bores 9a, 9b formed in the flange section 3 of the vessel mounting member 1 allows the first and second high pressure gas vessels 11a, 11b to be mounted to and retained with the vessel mounting member 1 and the auxiliary member 30 under a condition wherein central axes C1, C2 are maintained to be mutually parallel to one another, with the first and second high pressure gas vessels 11a, 11b being fixed to the mount surface 33 of the fuel cell powered vehicle FV under such a condition.

Further, since the other sides of the first and second high pressure gas vessels 11a, 11b are inserted through the first and second through-bores 16a, 16b, respectively, formed in the auxiliary member 30 to be installed to and retained with the auxiliary member 30, ensuring the thickness of the auxiliary member 30, i.e. more particularly, the length L of the first and second though-bores 16a, 16b to have a given value while taking into account the tolerance in design and fabrication as well as variations in mounting enables an adequate depth to be obtained for accommodating the neck portions 15a, 15b at the other sides of the first and second high pressure gas vessels 11a, 11b. That is, it is possible for the auxiliary member 30 to reliably absorb the balance in the heights, between the first and second high pressure gas vessels, that would be otherwise caused during design and fabrication steps as well as installation work, i.e. the variation in the distance, along the central axis C1, between the neck portion 13a at the one side of the first high pressure gas vessel 11a and the neck portion 15a at the other side thereof and the distance, along the central axis C2, between the neck portion 13b at the one side of the second high pressure gas vessel 11b and the neck portion 15b at the other side thereof, thereby effectively enabling the neck portion 15a at the other side of the first high pressure gas vessel 11a and the neck portion 15b at the other side of the second high pressure gas vessel 11b from being dislocated from the auxiliary member 30. And, in such a manner, the first and second high pressure gas vessels 11a, 11b are installed with and retained with the vessel mounting member 1 and the auxiliary member 30 under a condition wherein the variation in mutual heights of the vessels, i.e. the variation along the central axes C1 and C2 to allow the vessels are maintained in a given parallel relationship.

As a consequence, placing the vessel mounting member 1 and the auxiliary member 30 onto the given mount surface 33 within the fuel cell powered vehicle FV via the leg portions 31, 32 allows the first and second high pressure gas vessels 11a, 11b to be mounted in the fuel cell powered vehicle while maintaining the parallel relationship between the first and second high pressure gas vessels 11a, 11b and absorbing the variation in the heights of the vessels.

As previously described above, with the mounting structure for the high pressure gas vessels of the presently filed embodiment, since the first and second high pressure gas vessels 11a, 11b are installed with and supported with the vessel mounting member 1 and the auxiliary member 30 under a condition wherein the variation in the respective heights of the vessels are absorbed while maintaining the mutual parallel relationship, the mounting accuracies of these first and second high pressure gas vessels are further preferably improved, with a resultant capability of effectively precluding the stress strains from being produced at the joined portions of the gas flow passage 6 for thereby enabling the hermetic sealing effect to be further enhanced at the joined portions.

Further, even in the mounting structure for the high pressure gas vessel of the presently filed embodiment, it is also possible for the shapes of the vessel mounting member 1 and the auxiliary member 30 to be suitably altered in design.

Third Preferred Embodiment

Figure 10:
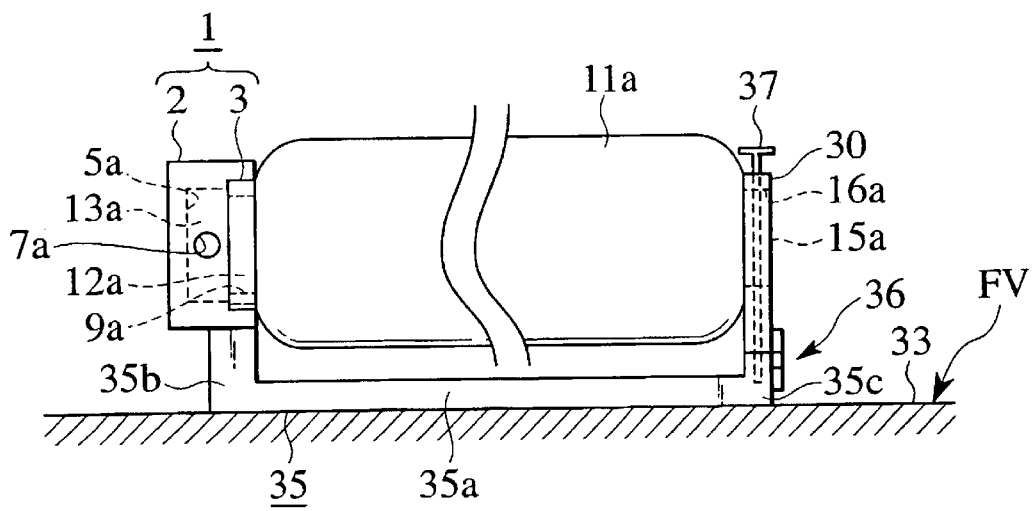
FIG. 10 is a side view illustrating a third preferred embodiment according to the present invention wherein the first and second high pressure gas vessels are supported at their one ends and the other ends with a vessel mounting member and an auxiliary member, respectively, which are unified via a connecting member.
Figure 11:
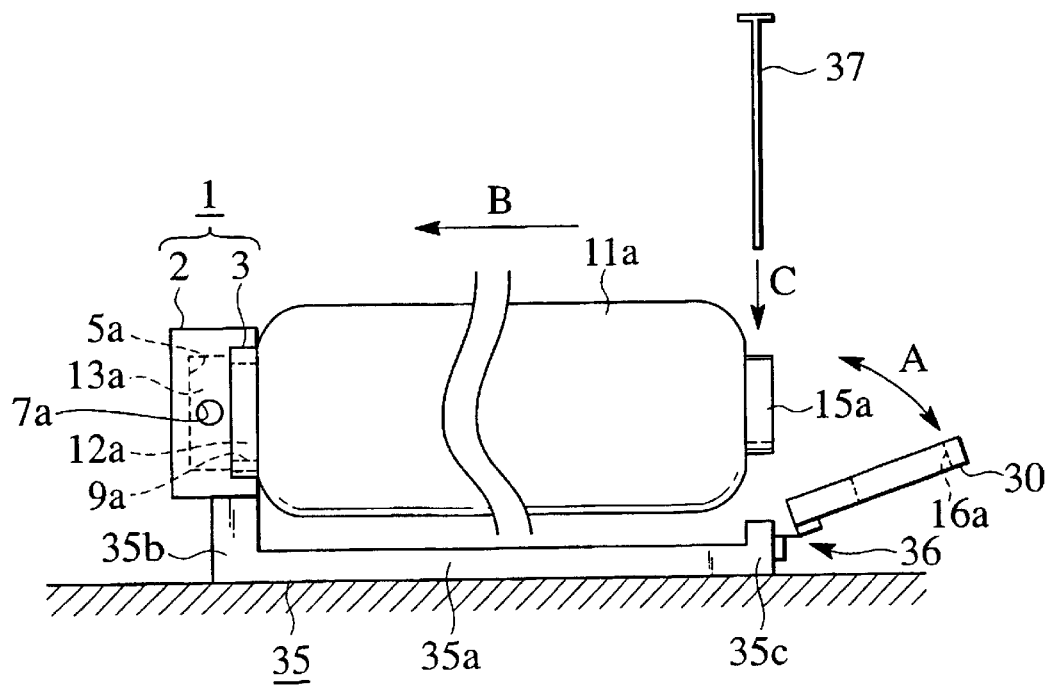
FIG. 11 is a side view illustrating how the one sides and the other sides of the first and second high pressure gas vessels are mounted to the vessel mounting member and the auxiliary member, respectively, in the third preferred embodiment.
Figure 12:
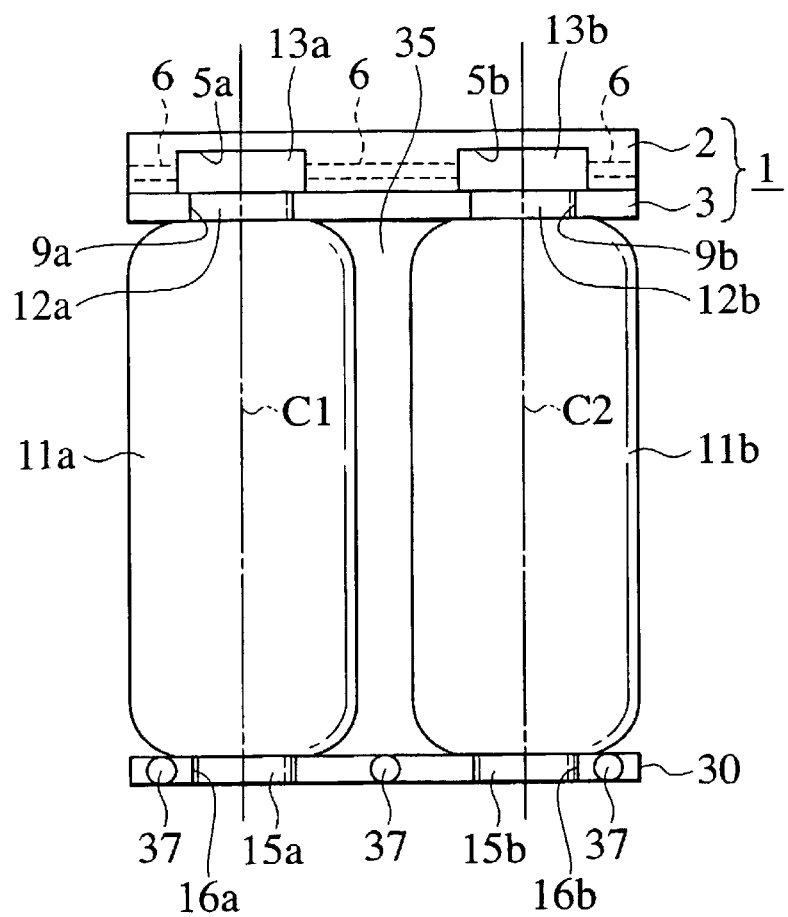
FIG. 12 is a plan view typically illustrating how the one sides and the other sides of the first and second high pressure gas vessels are mounted to the vessel mounting member and the auxiliary member, respectively, in the third preferred embodiment.

Now, the third preferred embodiment according to the present invention is described below. As shown in FIGS. 10 to 12, in a mounting structure for high pressure gas vessels of the presently filed embodiment, the vessel mounting member 1, to which one sides of the first and second high pressure gas vessels 11a, 11b are fixed, and the auxiliary member 30, to which the other sides of the first and second high pressure gas vessels 11a, 11b are fixed, are mutually connected to one another via a connecting member 35 to form a unified body. Also, it is to be noted here that the vessel mounting member 1 and the auxiliary member 30 substantially have the same fundamental structures as those of the first and second preferred embodiments and, therefore, a detailed description of the same is herein omitted.

As shown in FIGS. 10 to 12, the connecting member 35 is comprised of a base portion 35a which is installed on a given mount surface 33 within the fuel cell powered vehicle FV, a first leg portion 35b, that is equivalent to the leg portion 31 of the mounting member M in the second preferred embodiment, and a second leg portion 35c that is equivalent to the leg portion 32 of the auxiliary member 30 in the second preferred embodiment. The first leg portion 35b stands upright from the base portion 35a in a substantially vertical direction and has an upper distal end to which the vessel mounting member 1 is fixedly secured. On the other hand, the second leg portion 35c stands upright from the base portion 35a in a substantially vertical direction and has an upper distal end to which the auxiliary member 30 is mounted via a hinge 36. And, the auxiliary member 30 is rotatable in a direction as depicted by an arrow A in FIG. 11 due to the action of the hinge 36 such that when the auxiliary member 30 is shifted to a position opposed to the vessel mounting member 1, it is coupled with a bolt 37 and is fixed to the upper distal end of the second leg portion 35c of the connecting member 35.

With such a structure, under a condition wherein the auxiliary member 30 is rotated in the direction as shown by the arrow A in FIG. 11 and is released in a coupling state from the upper distal end of the second leg portion 35c of the connecting member 35, the first and second high pressure gas vessels 11a, 11b are allowed to be inserted in a direction as indicated by an arrow B in FIG. 11 to permit the one ends of the first and second high pressure gas vessels 11a, 11b to be mounted to the vessel mounting member 1 in the same manner as the first preferred embodiment. Subsequently, rotating the auxiliary member 30 toward the position opposed to the vessel mounting member 1 to permit the bolt 37 to be inserted in the direction as shown by the arrow C in FIG. 11 allows the other sides of the first and second high pressure vessels 11a, 11b to be mounted to the auxiliary member 30. Accordingly, the first and second high pressure gas vessels 11a, 11b are mounted to and supported with the vessel mounting member 1 and the auxiliary member 30 while maintaining the parallel relationship between these component parts.

Here, since the vessel mounting member 1 and the auxiliary member 30 are mutually connected to one another via the connecting member 35 to form the unitary structure, the relative position between the vessel mounting member 1 and the auxiliary member 30 is fixed.

Consequently, the presence of the vessel mounting member 1 and the auxiliary member 30 installed on the given mount surface 33 via the connecting member 35 within the fuel cell powered vehicle FV allows the first and second high pressure gas vessels 11a, 11b to be installed in the fuel cell powered vehicle while permitting the first and second high pressure gas vessels 11a, 11b to be maintained in the parallel relationship and allows the variation in mutual heights of the respective vessels to be absorbed while maintaining the relative position with respect to one another.

From the foregoing description, it will be appreciated that the mounting structure for the high pressure gas vessels of the presently filed embodiment allows the first and second high pressure gas vessels 11a, 11b to be maintained in the parallel relationship with respect to one another as in the preferred embodiments discussed above and also allows the squarenesses (centering precisions) of the first and second high pressure gas vessels 11a, 11b to be improved in the longitudinal directions thereof (in directions along the central axes C1, C2) with respect to the vessel mounting member 1 and the auxiliary member 30. Hence, with the mounting structure for the high pressure gas vessel of the presently filed embodiment, the mounting accuracies of the first and second high pressure gas vessels 11a, 11b are more preferably improved for thereby effectively precluding the stress strains from being generated at the joined portions relative to the gas flow passage 6 to reliably ensure a hermetic sealing effect at these joined portions.

Further, in the mounting structure for the high pressure gas vessels of the presently filed embodiment, it may be possible for the shapes of the vessel mounting member 1, the auxiliary member 30 and the connecting member 35 to be suitably altered in design.

Fourth Preferred Embodiment

Figure 13:
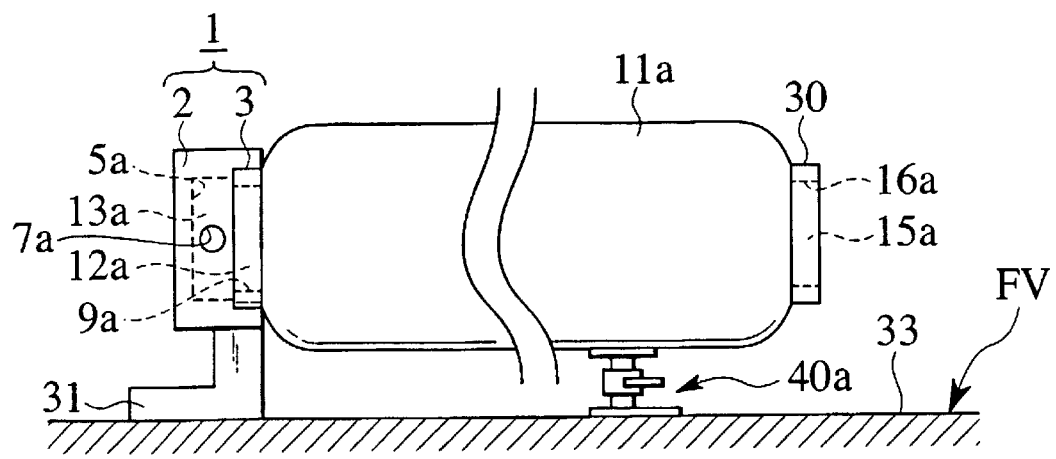
FIG. 13 is a side view of a fourth preferred embodiment according to the present invention to show how the other sides of the first and second high pressure gas vessels are located on a mount surface of a fuel cell powered vehicle via height adjustment units.
Figure 14:
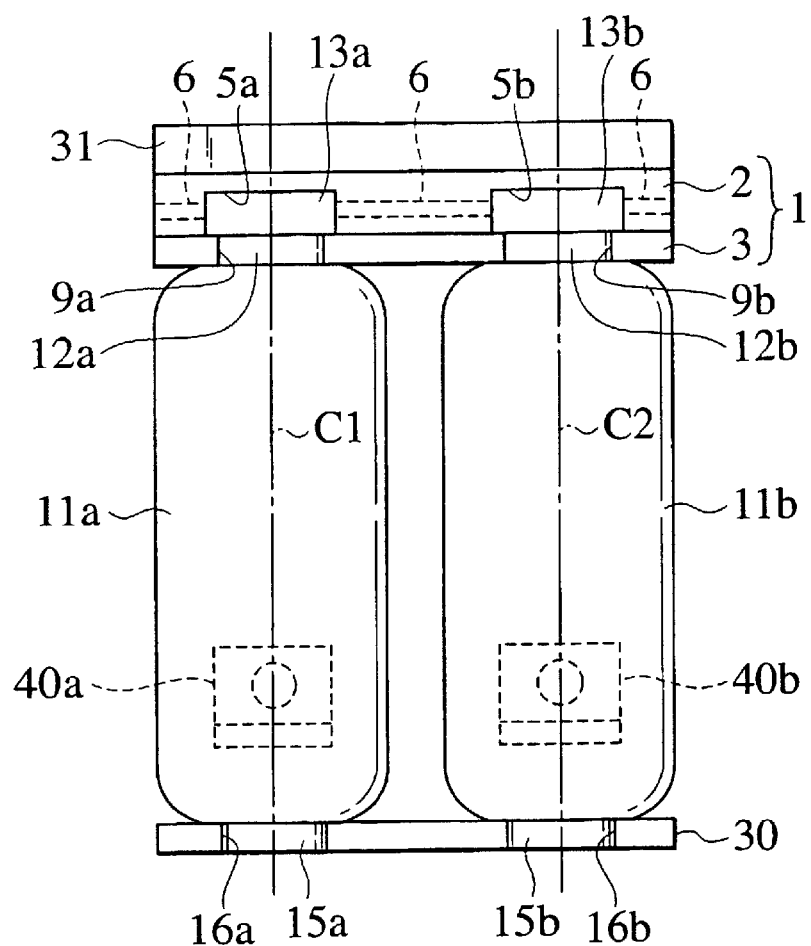
FIG. 14 is a plan view typically illustrating how the other ends of the first and second high pressure gas vessels are installed on the mount surface of the fuel cell powered vehicle via the height adjustment units of the fourth preferred embodiment.
Figure 15:
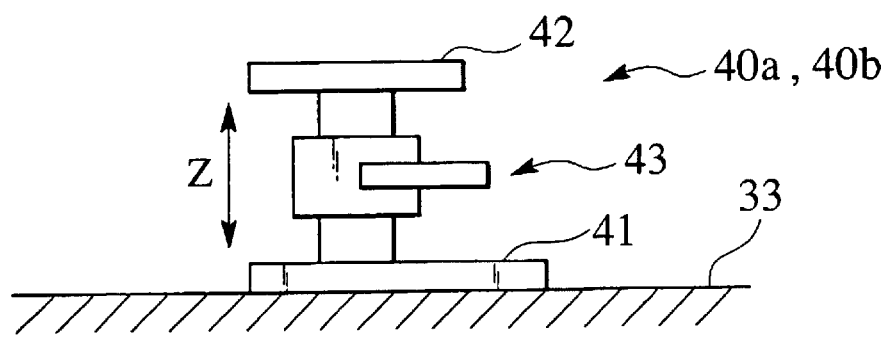
FIG. 15 is a side view of the height adjustment units of the fourth preferred embodiment.
Figure 16:
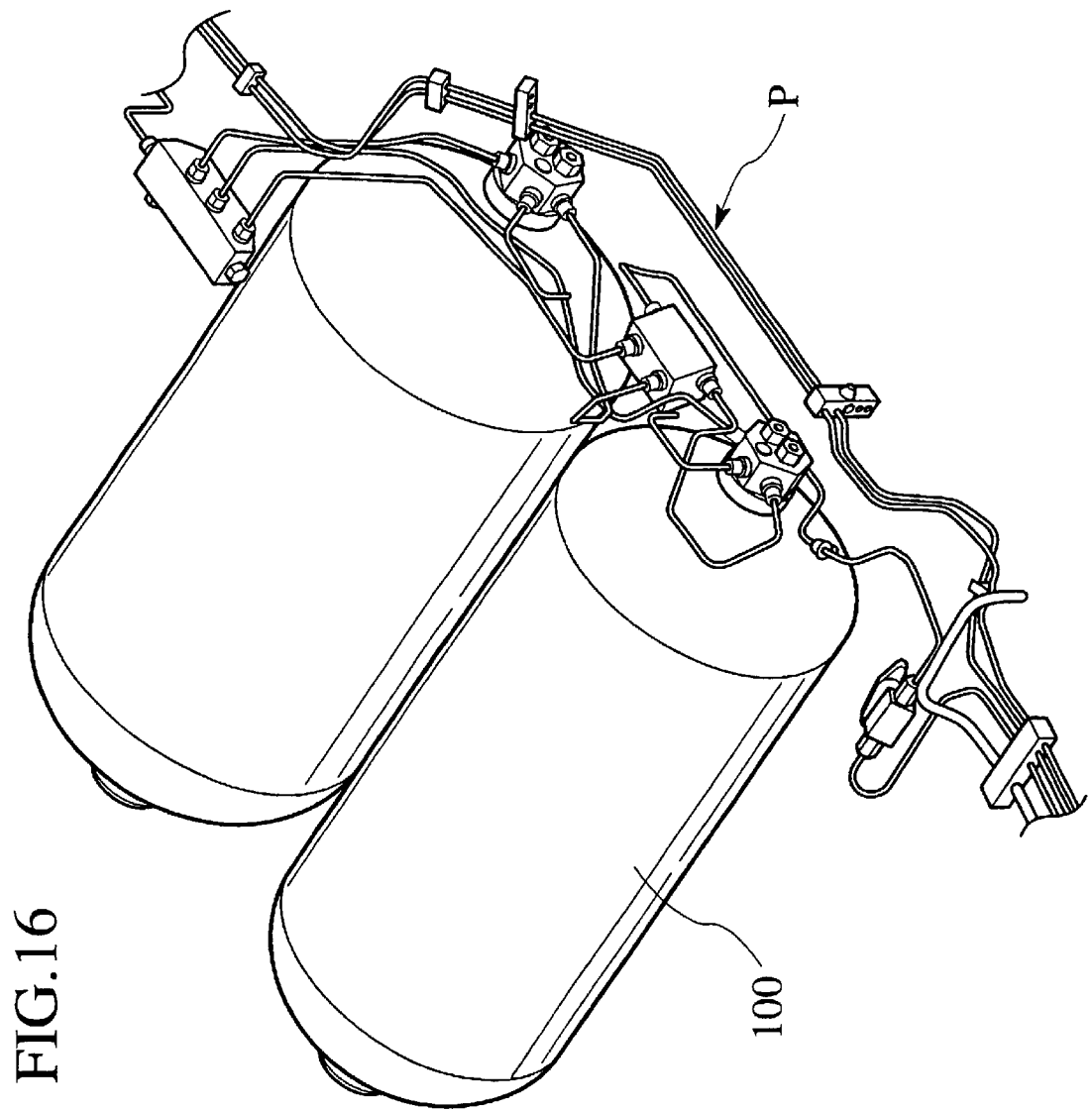
FIG. 16 is a perspective view illustrating a mounting structure for high pressure gas vessels studied by the present inventor.
Figure 17:
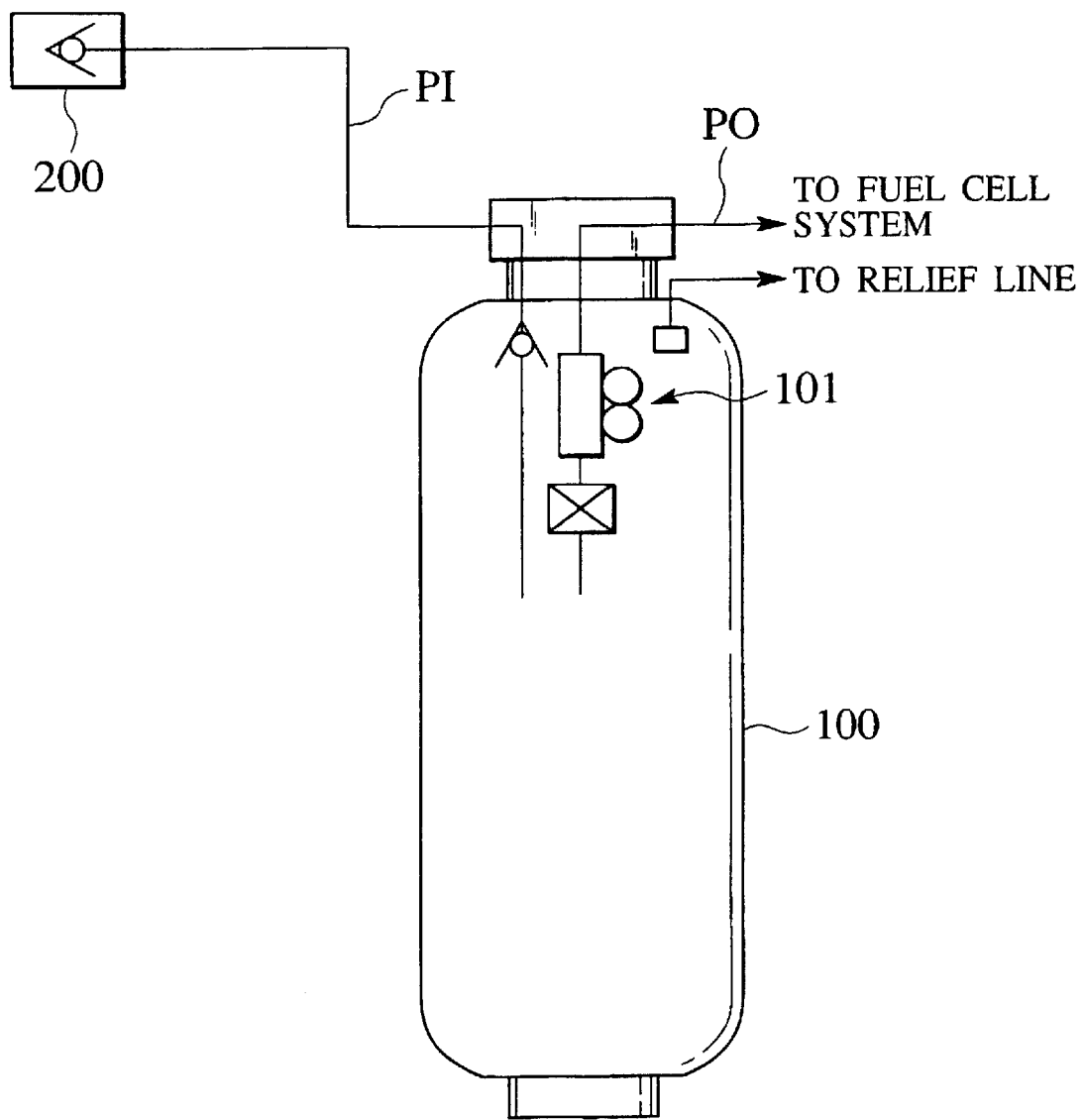
FIG. 17 is a typical view of the high pressure gas vessel containing therein a pressure reducing valve studied by the present inventor.
Figure 18:
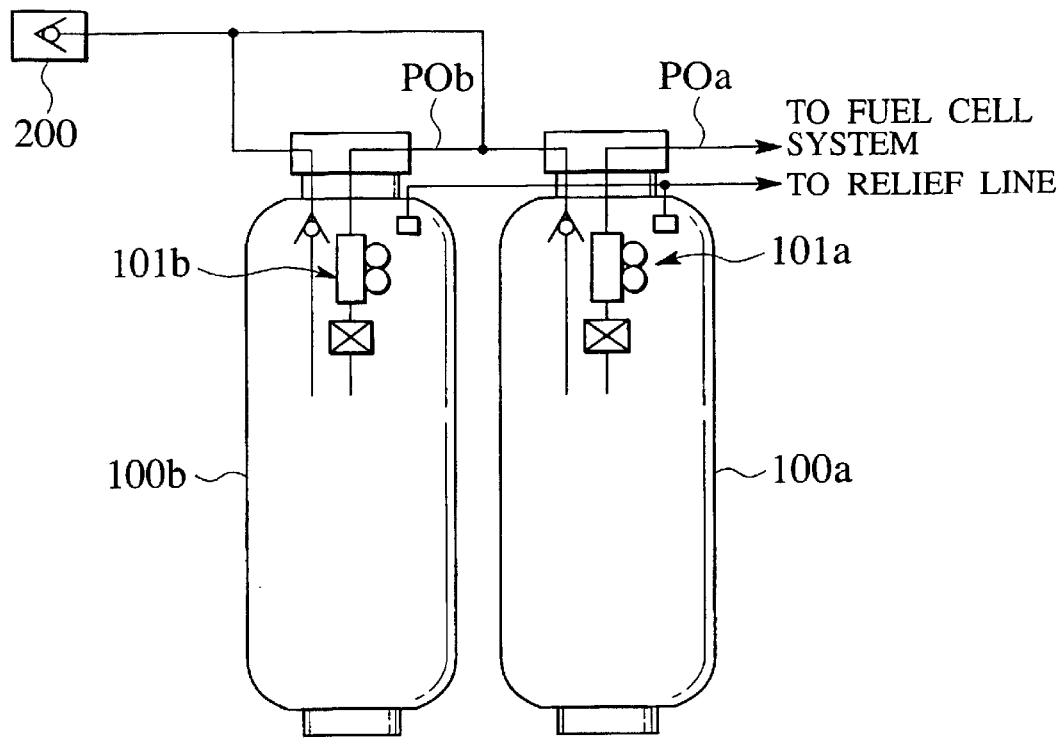
FIG. 18 is a typical view illustrating how a plurality of high pressure gas vessels, both containing therein the pressure reducing valves, are connected with the use of pipe members studied by the present inventor.
Figure 19:
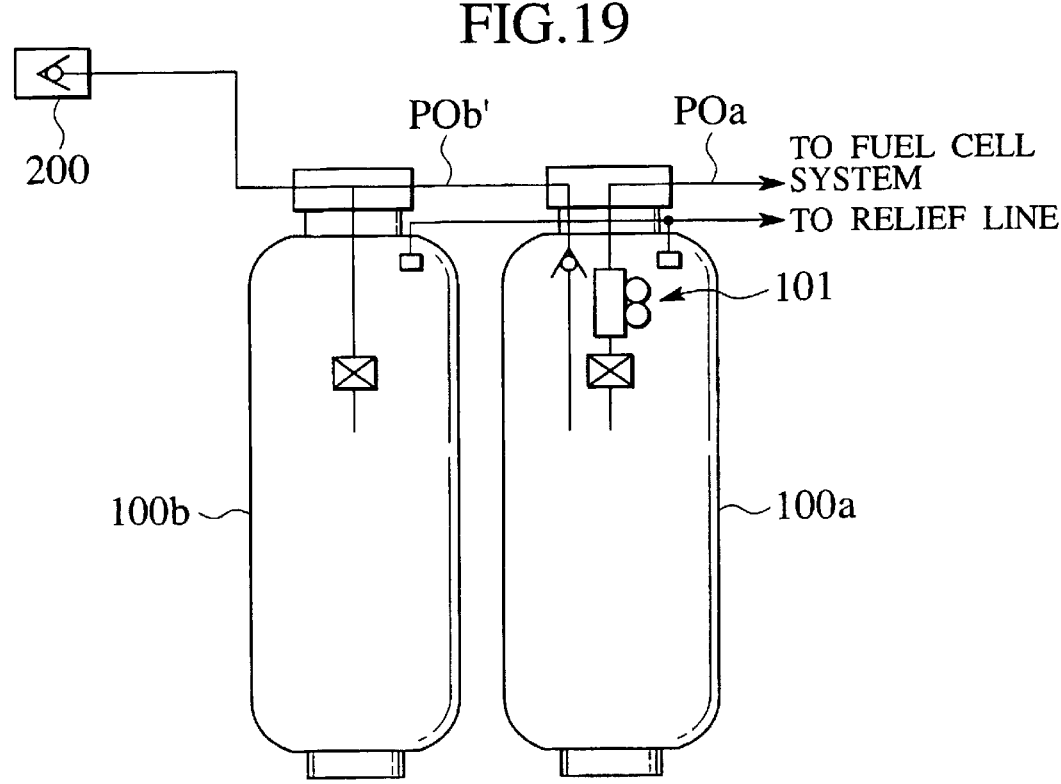
FIG. 19 is a typical view illustrating how the high pressure gas vessels, one of which contains therein the pressure reducing valves and the other one of which has no pressure reducing valve, are connected with the use of pipe members studied by the present inventor.

Finally, a fourth preferred embodiment of the present invention is described below. As shown in FIGS. 13 to 15, the mounting structure for the high pressure gas vessels of the presently filed embodiment incorporates height adjustment units 40a, 40b that serve as correcting mechanism, in place of the supporting leg portion 32 of the second preferred embodiment, which are located at the other sides of the first and second high pressure gas vessels 11a, 11b to allow the other sides (at the sides of the neck portions 15a, 15b) of the first and second high pressure gas vessels 11a, 11b to be installed on the given mount surface 33 in the fuel cell powered vehicle via the height adjusting units 40a, 40b. Also, since the vessel mounting member 1 and the auxiliary member 30 have the substantially same fundamental structures as those of the first to third preferred embodiments and, thus, the description of the same is herein omitted.

In FIGS. 13 to 15, the height adjusting units 40a, 40b include installation portions 41 located on the mount surface 33, supporting portions 42 which support the other sides of the first and second high pressure gas vessels 11a, 11b, and actuating portions 43 for varying the distance between the mount surface 33 and the supporting portion 42, respectively, as seen in FIG. 15. And, operating the actuating portion 43 to permit the supporting portion 42 to move toward and away from the installation portion 41 in directions to be close to or to be away from the same (in a direction as shown by an arrow Z in FIG. 15) allows the distance between the installation portion 41 and the supporting portion 42 to be adjusted. That is, it is possible for the height position of the other side of the first high pressure gas vessel 11a relative to the mount surface 33 to be adjusted with the height adjusting unit 40a and for the height position of the other side of the second high pressure gas vessel 11b relative to the mount surface 33 to be adjusted with the height adjusting unit 40b, thereby enabling the variation in level positions of the first and second high pressure gas vessels 11a, 11b to be suitably corrected.

It will be appreciated from the foregoing description that the mounting structure for the high pressure gas vessels of the presently filed embodiment enables the first and second high pressure gas vessels 11a, 11b to be maintained in a desired parallel relationship as attained in the various preceding preferred embodiments and also enables the variation in the level positions of the first and second high pressure gas vessels 11a, 11b to be corrected whereby the mounting accuracies of the first and second high pressure gas vessels 11a, 11b become more preferable to effectively preclude the stress strains from being generated at the joined portions relative to the gas flow passage 6 while concurrently further improving the hermetic sealing effect at these joined portions in a further reliable manner.

While, for the sake of simplicity of description, the presently filed embodiment has been described above with specific reference to a case where the two high pressure gas vessels 11a, 11b are mounted, it is to be noted that the present invention may also be effectively applied to a case where more than three high pressure gas vessels are mounted, like in the various preferred embodiments previously discussed.

Further, in the mounting structure for the high pressure gas vessels of the presently filed embodiment, it may be possible for the shapes of the vessel mounting member 1, the auxiliary member 30 and the height adjusting units 40a, 40b to be suitably altered in design. For example, the height adjusting units 40a, 40b may be located at the one sides (at the sides of the neck portions 12a, 12b) of the first and second high pressure gas vessels 11a, 11b to permit the one sides of the first and second high pressure gas vessels 11a, 11b to be adjusted in height with respect to the mount surface 33 for thereby correcting the variations in level positions of the first and second high pressure gas vessels 11a, 11b. Furthermore, it may be possible for the total sum of four pieces of such height adjustment units to be located such that the height adjustment units are positioned at the one sides and the other sides of the first and second high pressure gas vessels 11a, 11b, respectively.

The entire content of a Patent Application No. TOKUGAN 2001-146377 with a filing date of May 16, 2001 in Japan is hereby incorporated by reference.

Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

INDUSTRIAL APPLICABILITY

As clearly understood from the foregoing description given above, according to the present invention, the block-shaped vessel mounting member with the high rigidity has a structure wherein the accommodating portions are formed for receiving the neck portions and the vessel base-vales of the one ends of the plural high pressure gas vessels, with these accommodating portions communicating with each other to form the gas flow passage which opens through the openings at the right and left side walls of the vessel mounting member to allow the neck portions and the vessel base-valves at the one sides of the plural high pressure gas vessels to be received in the accommodating portions of the vessel mounting member, thereby enabling the plural high pressure gas vessels to be mounted to the vessel mounting member for thereby realizing the high hermetic sealing effect as well as simplified mounting operation. As a result, the invention is highly expected to have a wide range of applications involving the fuel cell powered vehicle that employs the high pressure gas vessels.

What is claimed is:

1. A mounting structure for a plurality of high pressure gas vessels each of which has one end formed with a first neck portion, comprising:
   a block-shaped vessel mounting member allowing each of the plurality of high pressure gas vessels to be mounted;
   a plurality of accommodating portions located in the vessel mounting member, with each of the plurality of accommodating portions having a shape that corresponds to the first neck portion of corresponding one of the plurality of high pressure gas vessels and a base-valve mounted at the first neck portion so as to accommodate the first neck portion and the base-valve; and
   a gas flow passage located in the vessel mounting member to allow gas, contained in each of the plurality of high pressure gas vessels, to pass therethrough, the gas flow passage allowing the plurality of accommodating portions to communicate with one another while allowing the vessel mounting member to open at one side thereof and at the other side thereof,
   wherein each of the plurality of high pressure gas vessels is mounted to the vessel mounting member under a condition where the first neck portion and the base-valve, mounted at the first neck portion, are received in corresponding one of the plurality of accommodating portions located in the vessel mounting member.

2. A mounting structure according to claim 1, wherein the vessel mounting member comprises a combination of a flange section, through which a plurality of through-bores are formed, and a body section formed with a plurality of concave portions and the gas flow passage, with each of the plurality of through-bores having a shape that corresponds to the neck portion of the one side of each of the plurality of high pressure gas vessels and each of the plurality of concave portions having a shape that corresponds to the base-valve mounted to the neck portion of the one side of each of the plurality of high pressure gas vessels.

3. A mounting structure according to claim 2, wherein the body section is formed with a recessed portion to which the flange section is fitted to form the vessel mounting member in a unitary structure.

4. A mounting structure according to claim 1, further comprising a block-shaped auxiliary member forming a pair with the vessel mounting member and having a plurality of accommodating portions;
   wherein each of the accommodating portions of the auxiliary member has a shape that corresponds to a second neck portion formed at the other side of each of the plurality of high pressure gas vessels.

5. A mounting structure according to claim 4, wherein each of the plurality of high pressure gas vessels is mounted between the vessel mounting member and the auxiliary member under a condition wherein the second neck portion of each of the plurality of high pressure gas vessels is received in corresponding one of the plurality of accommodating portions.

6. A mounting structure according to claim 4, wherein the plurality of accommodating portions formed in the auxiliary member absorbs a variation in height of each of the plurality of high pressure gas vessels.

7. A mounting structure according to claim 6, wherein each of the plurality of accommodating portions of the auxiliary member has a bore that accommodates the second neck portion of corresponding one of the plurality of high pressure gas vessels, with each of the plurality of accommodating portions absorbing the variation in height of corresponding one of the plurality of high pressure gas vessels through the use of an accommodating depth of the bore.

8. A mounting structure according to claim 4, further comprising a connecting member through which the vessel mounting member and the auxiliary member are unified.

9. A mounting structure according to claim 8, wherein the auxiliary member is rotatable relative to the connecting member.

10. A mounting structure according to claim 1, further comprising a correcting mechanism correcting a variation in level positions of the plurality of high pressure gas vessels.

11. A mounting structure according to claim 10, wherein the correcting mechanism serves to adjust a distance between a mount surface on which the plurality of high pressure gas vessels are installed and each of the plurality of high pressure gas vessels.

12. A mounting structure according to claim 1, further comprising a pressure reducing valve mounted in one, of the plurality of high pressure gas vessels, mounted at a rearmost trailing side of the gas flow passage formed in the vessel mounting member.

13. A mounting structure according to claim 1, further comprising a pressure reducing valve located in a trailing side of the gas flow passage within the one of the plurality of the plurality of high pressure gas vessels.

14. A mounting structure for a plurality of high pressure gas vessels each of which has one end formed with a first neck portion, comprising:
   vessel mounting means for allowing each of the plurality of high pressure gas vessels to be mounted;
   accommodating means, which is located in the vessel mounting means, for accommodating the first neck portion and a base-valve mounted to the first neck portion, the accommodating means being associated with the plurality of high pressure gas vessels and having a shape that corresponds to the first neck portion and the base-valve mounted at the first neck portion of corresponding one of the plurality of high pressure gas vessels; and
   gas flow passage means, which is located in the vessel mounting means, for allowing gas, contained in each of the plurality of high pressure gas vessels, to pass therethrough, the gas flow passage means allowing the accommodating means to communicate with an outside of the vessel mounting means,
   wherein each of the plurality of high pressure gas vessels is mounted to the vessel mounting means under a condition where the first neck portion and the base-valve, mounted to the first neck portion, are received in the accommodating means located in the vessel mounting means.

15. A method of mounting a plurality of high pressure gas vessels each of which has one end formed with a first neck portion, comprising:
   preparing a vessel mounting member which is formed with a plurality of accommodating portions and a gas flow passage, the plurality of accommodating portions being associated with the plurality of high pressure gas vessels, respectively, and each of the plurality of accommodating portions having a shape that corresponds to the first neck portion and the base-valve mounted at the first neck portion of corresponding one of the plurality of high pressure gas vessels, the gas flow passage allowing gas, contained in each of the plurality of high pressure gas vessels, to flow therethrough and allowing the plurality of accommodating portions to communicate with one another while opening at both one side and the other side of the vessel mounting member;

accommodating the first neck portion of each of the plurality of high pressure gas vessels and the base-valve mounted at the neck portion in corresponding one of the plurality of accommodating portions formed in the vessel mounting member; and mounting each of the plurality of high pressure gas vessels in the vessel mounting member under a condition where the first neck portion and the base-valve, mounted to the first neck portion, are received in corresponding one of the plurality of accommodating portions located in the vessel mounting member.

* * * * *